Feb. 3, 1942.  R. S. COLLEY  2,271,760
APPARATUS FOR PREVENTING THE ACCUMULATION OF ICE
Filed July 19, 1939  3 Sheets-Sheet 1
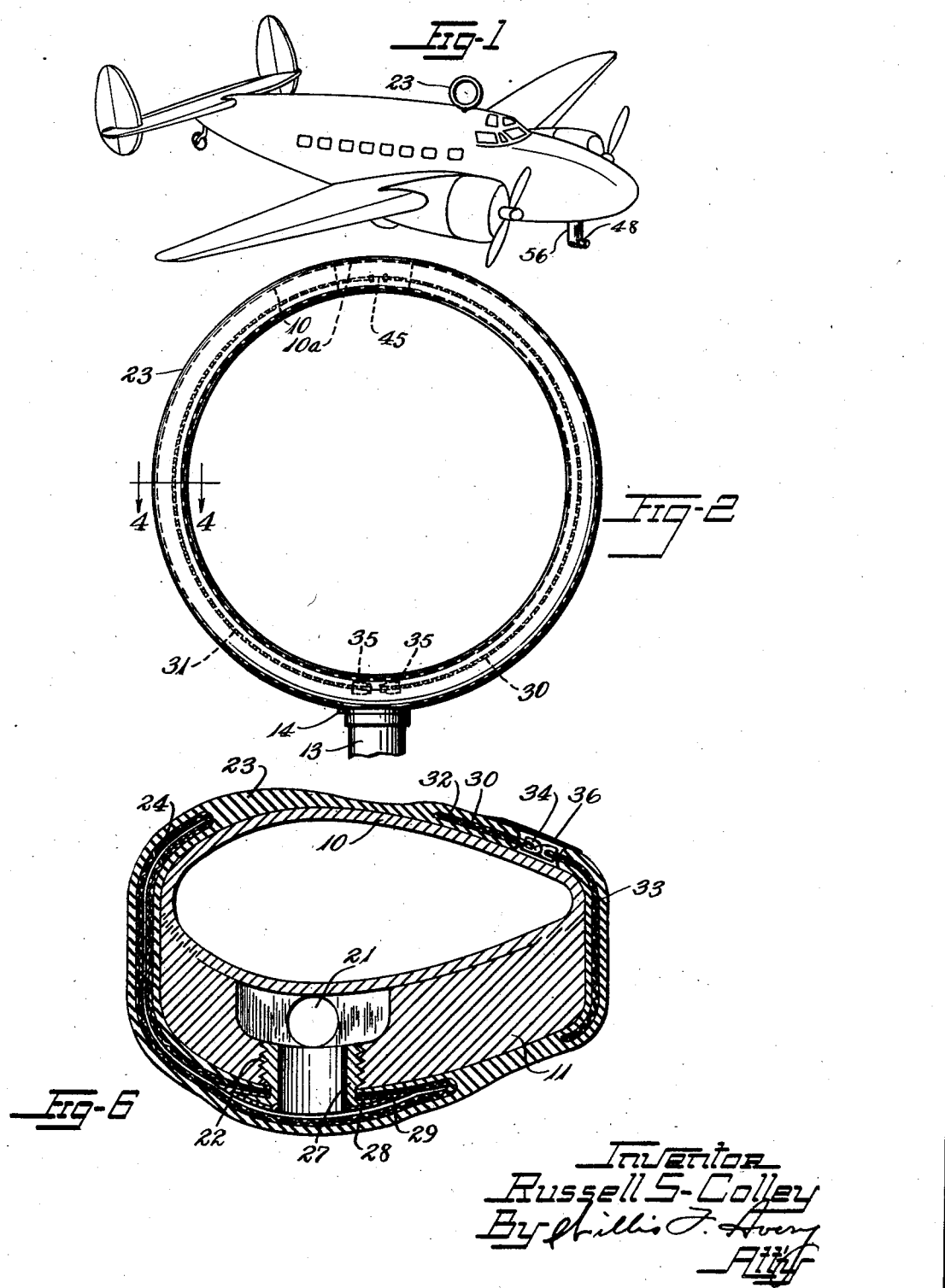

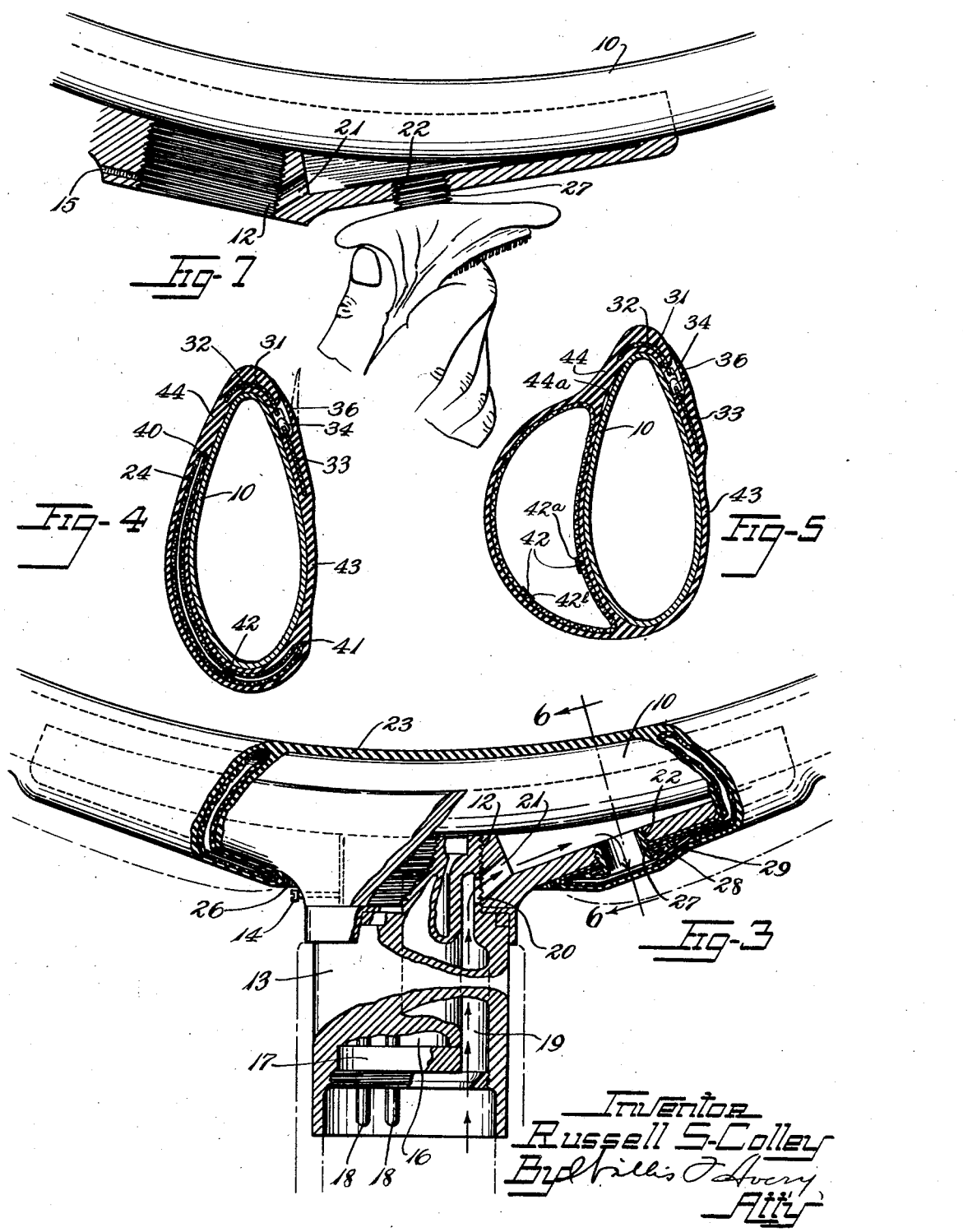

Feb. 3, 1942. R. S. COLLEY 2,271,760
APPARATUS FOR PREVENTING THE ACCUMULATION OF ICE
Filed July 19, 1939 3 Sheets-Sheet 3
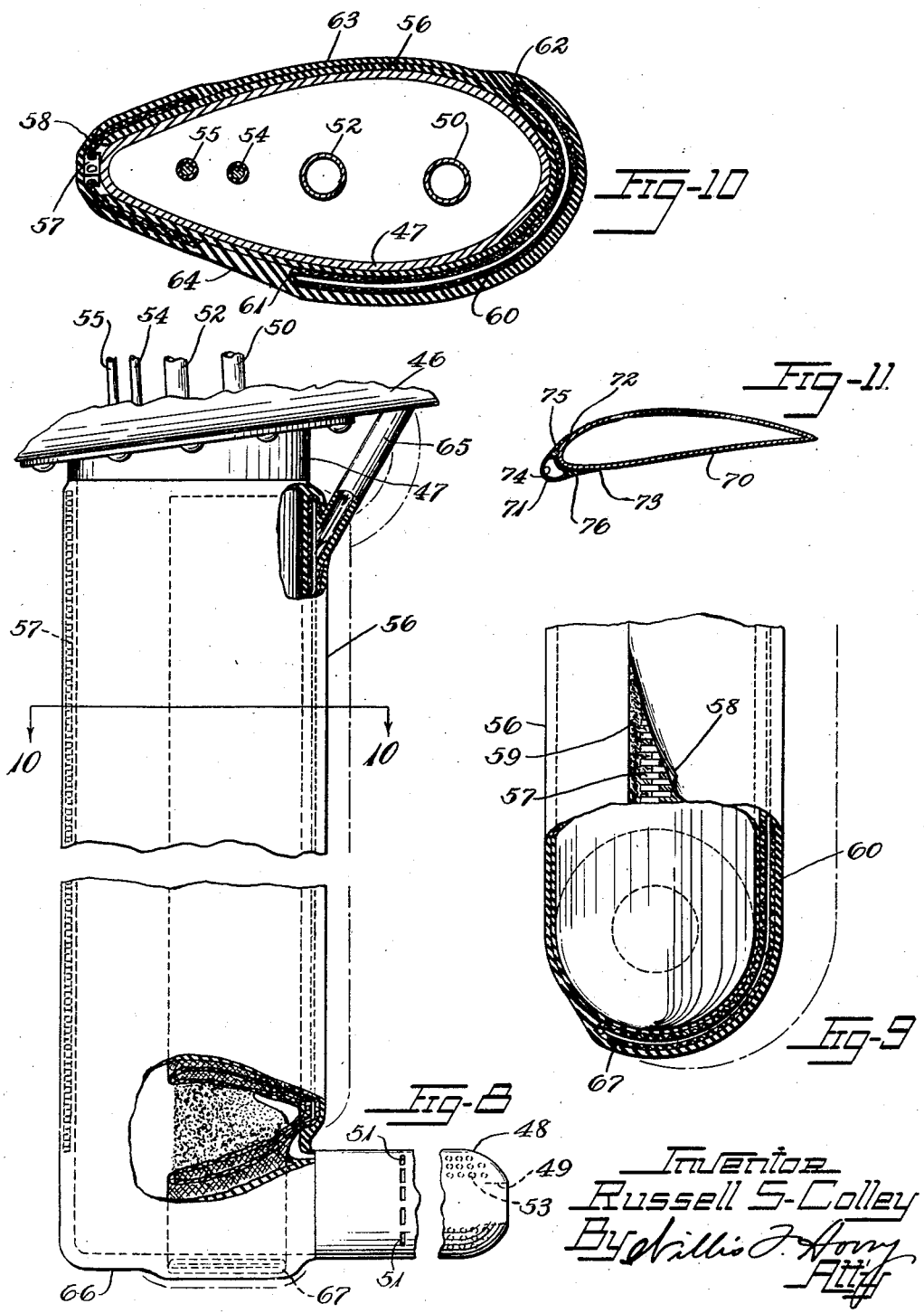
Inventor
Russell S. Colley Patented Feb. 3, 1942

2,271,760

UNITED STATES PATENT OFFICE 2,271,760

APPARATUS FOR PREVENTING THE ACCUMULATION OF ICE

Russell S. Colley, Kent, Ohio, assignor to The B. F. Goodrich Company, New York, N. Y., a corporation of New York Application July 19, 1939, Serial No. 285,297

19 Claims. (Cl. 244—134)

This apparatus relates to apparatus for preventing the accumulation of ice, and is especially useful in preventing the accumulation of ice upon exposed small-section surfaces, including small-section airfoils and other elements of aircraft, such as loop aerials, masts, Pitot tubes, struts, and the like where it is desired to remove the ice by varying the contour of the surfaces.

Ice has been successfully removed heretofore at the leading edges of wings and other elements of relatively thick section by inflatable shoes mounted upon such leading edges. Owing to the thickness of the elements the broken pieces of ice resulting from the inflation of the shoe have readily become unbalanced with respect to the air flow and have been quickly dislodged and removed. The same considerations do not apply, however, at the leading edges of very small-section elements, where the lack of thickness of the section renders it less likely that the ice that is moved outwardly from the leading edge upon inflation of the shoe will be positioned in an unbalanced relation to the air flow, and on such small-section elements ice removal by inflatable means has been less effective.

Also, where the projecting part of a member of the aircraft is movable with relation to the part of the craft to which it is attached, as in the case of a loop aerial, the provision of means for preventing the accumulation of ice presents a problem of providing satisfactory connections for the inflating means.

It is also desirable to provide ice removal means which may be readily removed and replaced at will. The loop aerial used on aircraft has presented such a problem of providing satisfactory means for preventing the accumulation of ice as it is necessary to orient the loop with respect to the fuselage of the plane or other part of the aircraft from which the loop projects and to which it is attached.

The shape of the loop also presents another problem as the inflatable members must be capable of stretch in both directions because, while inflation occurring on the inside of the loop would result in a reduction of inner circumference requiring surface compressibility of the equipment, and inflation on the outside of the loop requires circumferential stretch of the inflation means providing an increase in circumference, inflation at the side of the loop requires extensibility crosswise of the inflation means.

Some of these problems are also present in the provision of means for the prevention of the accumulation of ice on masts, Pitot tubes, and other projecting minor parts of aircraft, especially in supplying satisfactory air connections for reliable operation and in providing for ease of removability and replacement, in addition to providing for effective ice removal despite the smallness of the section.

The principal objects of the present invention are to provide effectively for preventing the accumulation of ice, especially upon small-section elements of aircraft, to provide movability of the loop or other instrument with respect to the parts to which it is attached without interfering with the operation of the means for preventing the accumulation of ice, to provide means of attachment permitting quick detachment, to provide controlled extensibility, and generally to provide minimum resistance to travel of the craft through the atmosphere, to provide neatness of appearance and facility of manufacture.

These and other objects will appear from the following description and the accompanying drawings.

Of the drawings:

Fig. 1 is a perspective view of an airplane showing the location of the loop aerial and the Pitot tube.

Fig. 2 is a side elevation of the loop with the apparatus for preventing the accumulation of ice mounted thereon and in deflated condition.

Fig. 3 is a side elevation to a greater scale, partly in section, showing the attaching portion of the loop with the means for preventing the accumulation of ice attached thereto, parts being broken away and parts shown in section, other portions being broken away.

Fig. 4 is a cross sectional view of the loop and means for preventing the accumulation of ice, taken on line 4—4 of Fig. 2 and showing the uninflated position of the parts.

Fig. 5 is a similar view with the parts in inflated condition.

Fig. 6 is a cross sectional view taken on line 6—6 of Fig. 3, showing the air connections.

Fig. 7 is a side elevation of the attaching portion of the loop illustrating how the air connection is made in applying the cover for preventing the accumulation of ice on the loop, the saddle portion of the loop being shown in cross section and other parts being broken away.

Fig. 8 is a side elevation of a Pitot tube with the apparatus for preventing the accumulation of ice mounted thereon and in deflated position.

Fig. 9 is a rear elevation of the lower post thereof partly in section, the upper part being broken away.

Fig. 10 is a cross sectional view taken on line 10—10 of Fig. 8, showing the parts in deflated position.

Fig. 11 is a cross sectional view of an airfoil showing the invention applied thereto, the jacket being inflated.

Referring to the drawings, and first to the embodiment of the invention illustrated in Figs. 1 to 7 of the drawings, the loop 10 comprises a hollow, annular body, usually formed of light metal tubing such as aluminum, except for a portion 10a of insulating material at one side thereof to break the metallic circuit, and streamlined in cross section, within which the electrical conductors, (not shown) comprising the windings, are enclosed. A saddle 11 also of light weight metal is secured to the annular body at one portion of its periphery and is provided with a threaded opening 12 adapted to receive a threaded post 13, and a set screw 14 extending through a threaded opening 15 in the saddle is adapted to engage the top of the post and prevent its rotation with respect to the saddle. The post 13 may be rotated with respect to the aircraft upon which it is mounted and is provided with a tubular passage 16 extending axially thereof closed by an insulating plug 17 through which terminal prongs 18, 18 extend for providing electrical connections to the conductors within the loop. The post 13 is also formed with an air passage 19 extending axially therealong and terminating in a side aperture 20 in its threaded portion, the side aperture communicating with an air passage 21 in the saddle which in turn communicates with a threaded opening 22 in the outer surface of the saddle. The arrangement is such that the interior of the tube forming the annular body of the loop is sealed from the air passage and an air connection is provided from the threaded aperture 22 on the outer surface of the loop through the rotatable post 13 to connect with a source of fluctuating air pressure mounted within the craft.

The means for preventing accumulation of ice comprises a jacket 23 of elastic rubber-like material having the shape of the annular body of the loop and adapted to be detachably secured thereto. Mounted within the wall of the jacket 23 about a zone thereof corresponding to the nose of the loop is a normally flattened stretchable tube 24 of rubberized fabric, preferably of knit fabric such as stockinet. This tube extends further around the body of the loop on the outside of the annular body, as to the point 40 of Fig. 4, then on the inside thereof, as to the point 41, so that when the tube is inflated the jacket will assume a shape shown in Fig. 5, the effect being to materially increase the outer circumference of the jacketed annular body without decreasing its inner circumference and without excessively changing the general cross sectional form of the annular body and its jacket.

To provide proper extensibility of the tube 24 in a direction increasing its greatest circumference the fabric of the tube wall between the point 40 and the line 42 is made of fabric extensible lengthwise thereof and substantially inextensible crosswise thereof laid circumferentially of the loop whereas the fabric of the tube between the point 41 and the line 42 is of material extensible in width but substantially inextensible in length and laid circumferentially of the loop to provide for stretch in the opposite direction. The edges of these two strips abut at the line 42 and the seam is reinforced on each side by thin narrow strips 42a, 42b of rubberized bias cut square woven fabric.

The arrangement is such that all of the fabric strips act together to permit increase of the great circumference of the loop covering so that the fore and aft center of the streamlined covering moves laterally of the fore and aft axis of the streamlined loop section during inflation of the tube 24, a condition which causes any ice thereon to be stretched and broken and any ice on the nose of the ring to be moved laterally to a position of unbalance in the air-flow where it is blown away.

To provide further for the accomplishment of this lateral movement, and to provide for an actual shifting of the tube 24 relative to the nose of the loop section, a wide zone 43 of the jacket wall adjacent the point 41 is made of elastic stretchable rubber-like material and a narrower zone 44 on the outside of the loop adjacent the point 40 is made of similar material, preferably thicker. The arrangement is such that tensioning of the rubber walls of the jacket when the tube is inflated causes the jacket to stretch most over the zone 43 thereby shifting the tube toward the outside of the loop and with it any ice accumulated thereover.

The inflatable rubberized fabric tube extends circumferentially about the jacket except in the region of the stem 13 of the loop where an aperture 26 large enough to clear the post of the loop is provided in the jacket. At one end the tube is provided with an outwardly extending threaded metal stem 27, preferably vulcanized thereto, which projects toward the loop body from the jacket and engages the threads of the aperture 22 in the saddle of the loop, thereby providing an air connection from the inflatable tube to the air passage in the saddle. The stem 27 has a flange 28 about which a rubber flange 29 is vulcanized, the rubber flange being vulcanized, or cemented to the jacket.

To provide for demountably securing the jacket to the loop the jacket is split circumferentially along the inside of the loop near the tail thereof and a pair of slide fasteners 30, 31 are provided for closing the opening. Each slide fastener extends substantially one-half of the circumferential length of the split in the jacket leaving an electrically insulated gap 45 and each comprises fabric tapes or stringers 32, 33 embedded in and vulcanized to the walls of the jacket at opposite margins of the seam and having metallic interlocking fastener elements 34 secured in its margin. The fastener elements on opposite tapes are adapted to interengage when manipulated by slider elements 35, 35. The slide fasteners are preferably of a type in which the fastener tapes may be completely separated from each other when the slider is moved to open the seam. By the employment of two slide fasteners separated by a portion 45 where no metal exists and located at the insulated portion 10a of the loop, a complete annular electrical circuit, which would interfere with the operation of the loop, is avoided.

One of the margins of the jacket adjacent the seam is formed with a flap 36 adapted to overlap the seam and to be cemented to the opposite margin of the jacket by means of a layer of adhesive to completely enclose the slide fasteners and seal the jacket, the flap having a feathered margin so as to reduce resistance to the atmosphere. The circumferential seam of the jacket permits its application and removal to the annular body of the loop without difficulty. In mounting the covering upon the loop the jacket may be turned inside out and grasped in the hand as in Fig. 7 so that the threaded stem 27 is near the thumb and fore finger of the hand. The entire jacket may then be rotated about the axis of the stem until the stem has been threaded into the aperture 22 in the saddle, the rubber body of the jacket adjacent the stem being slightly compressed between the flange 28 of the stem and the saddle so as to seal the threaded aperture. The aperture 26 in the jacket is then stretched over the stem 13 of the loop and the remainder of the jacket may then be drawn over the annular part of the loop, the opposite margins of the jacket being drawn together progressively by operating the sliders of the slide fasteners. A coating of cement may then be applied to the margin of the jacket and the flap 36 may be pasted thereover. The cement may be of nonvulcanizable type so that the flap may be opened to remove the loop jacket by application of a solvent thereto. The outer surface of the jacket may be coated with material adapted to resist the adhesion of ice if desired or materials may be compounded in the rubber material for this purpose. The loop may be mounted upon a swivel connection so that it may be orientated with respect to the craft upon which it is mounted and suitable connections for supplying air under fluctuating pressure may be made through the swivel so as to cause the jacket to pulsate between the uninflated position of Fig. 4 and the inflated position thereof of Fig. 5 irrespective of the position in which the loop is turned with respect to the craft upon which it is mounted.

In the embodiment of Figs. 8 to 10 of the drawings the numeral 46 designates the fuselage of an airplane from which projects the mast 47 of the Pitot tube 48. The mast is of streamlined cross section. The Pitot tube 48 is electrically heated to prevent formation of ice thereon. It has a forwardly open aperture 49 connected to instruments within the fuselage by a tube 50, and side openings 51 connected to the instruments by a tube 52. Current for supplying the heating element 53 is supplied by wires 54, 55 through the mast.

To prevent accumulation of ice on the mast, a jacket 56 is fitted about the mast. The jacket is of extensibly elastic rubber-like material, such as vulcanized rubber or the like, and is split up the rear of the mast to provide for application and removal, the margins being secured to each other by a slide fastener 57. A sealing flap 58 extends from one margin over the fastener and may be sealed to the other margin by means of cement 59.

To provide for varying the contour of the jacket to remove ice therefrom, an expansible inflatable tube 60 is built in the wall of the jacket about the nose of the mast, the tube extending further on one side of the mast, as to the line 61, than on the opposite side, as to the line 62. That part of the jacket 63 between the line 62 and the slide fastener is relatively wide and of extensible rubber, whereas that portion 64 between the line 61 and the slide fastener is also extensible but relatively narrow so that when the jacket is stretched by inflation of the tube 60 the portion 63 will stretch more than the portion 64 causing the tube to move laterally of the mast toward the portion 64 and moving any accumulated ice on the nose of the jacket laterally into the air stream where it is blown away by the pressure of the atmosphere due to the velocity of the aircraft.

To provide strength against longitudinal stretch and to provide stretchability of the tube in cross section, the tube is formed of stockinet or other one-way stretchable fabric rubberized on both sides so as to hold air under pressure, the fabric being arranged with its inextensible direction lengthwise of the mast. To provide for inflation of the tube 60, a flexible rubber tube 65 is connected thereto and extends to the fuselage where it is connected to pressure means, not shown. If desired, however, air connection may be made through the mast by providing the tube with a threaded stud to fit a threaded aperture in the mast as in the case of the loop covering previously described.

If desired, the jacket 56 may be formed to extend about the foot of the mast as at 66, and the tube 60 may be extended under the foot from one side, as at 67 to provide for removal of ice at this location.

In Fig. 11, the invention is shown as applied to an airfoil of a plane. The numeral 70 designates the airfoil to which the elastic jacket 71 is applied. In this case the jacket need not entirely enclose the airfoil but may be applied over the nose thereof as from a point 72 on the upper surface to a point 73 on the lower surface. The extensible tube 74 is made of rubberized fabric stretchable circumferentially and not lengthwise of the tube. It is vulcanized to the jacket which is of rubber-like elastic material. The portion 75 of the jacket adjacent the inflatable tube and extending over the upper surface of the airfoil is more extensible than the portion 76 of the jacket adjacent the tube extending over the under side of the airfoil so that when both portions are tensioned by inflation of the tube the portion 75, stretching more than the portion 76, will cause the inflated tube to move forwardly and preferably also downwardly with respect to the nose of the airfoil, so that the effective camber of the wing is not lessened by the inflation of the tube. If desired, the direction of extension of the tube may be sufficiently downward to cause an actual increase in the camber of the wing. This construction is useful especially at or near wing tips of very thin section to provide effective ice removal and at the same time maintain the desired lift characteristics.

The shifting movement of the inflatable member thus is caused to be in a downward direction, and therefore the wing camber is not reduced and lessening of lift of the airfoil due to such inflation is avoided. An actual increase in lift may be accomplished while the removal of ice is effected by shifting of the ice formation with respect to the air stream even where the nose of the airfoil is relatively thin, as near or at the tip of a wing. Similar ice removing equipment may be employed on other thin airfoils such as the vertical and horizontal stabilizers.

Similar embodiments of the invention may be employed for removing ice from radio masts, struts, and other small projecting parts of aircraft.

In any of the embodiments of the invention, the inflatable tube is connected to means for intermittently inflating and deflating the tube by means of pulsating air pressure so that any ice accumulating on the leading edge of the jacket is cracked and moved off center where it is blown away.

These and other modifications may be made without departing from the spirit of the invention as it is defined by the following claims.

I claim:

1. Apparatus for preventing the accumulation of ice upon an object having a leading edge, said apparatus comprising stretchable surface means disposed across the leading edge and at the sides of said leading edge, and means for extending the surface means outwardly from the leading edge, said surface means having a greater extent of stretchability at one side of the leading edge than the other whereby under the extension it is caused to be moved predominately to the last-mentioned side.

2. Apparatus for preventing the accumulation of ice upon a small-section leading edge comprising an inflatable element adapted to be positioned across the leading edge including a stretchable covering therefore disposed at both sides of the leading edge, the inflatable portion of said element being disposed predominately to one side of the leading edge and said covering being more freely stretchable at the other side whereby under inflation said element is caused to bulge predominately at the first mentioned side of the leading edge, and means for inflating and deflating said element.

3. Apparatus for preventing the accumulation of ice upon an element, said apparatus comprising a removable extensibly elastic jacket adapted to enclose a leading portion of said element, an inflatable tube in said jacket extending along said element and offset with respect to the fore and aft axis of said portion substantially uniformly throughout at least the major part of its extent, and means for intermittently inflating the tube.

4. Apparatus for preventing the accumulation of ice upon an element, said apparatus comprising an extensibly elastic jacket adapted to enclose a leading portion of said element, an inflatable tube in said jacket, means for intermittently inflating the tube, and means for removably securing the jacket in place, said inflating and securing means comprising a tubular element providing a pressure fluid connection in communication with said tube and adapted to be connected detachably to said element.

5. Apparatus for preventing the accumulation of ice on aircraft, said apparatus comprising an extensibly elastic jacket adapted to enclose the leading edge of an exposed portion of the aircraft, and an inflatable tube in said jacket about the leading edge of said portion, a zone of extensible jacket wall adjacent the tube on one side of the leading edge having greater extensibility than the jacket wall on the other side of the leading edge.

6. Apparatus for preventing the accumulation of ice upon an annular body, said apparatus comprising an annular ice-removing jacket having an annular slit open entirely around the periphery to permit mounting the jacket over an annular object, and slide fastener means mounted on the margins of the slit for closing the same.

7. Apparatus for preventing the accumulation of ice upon an annular body, said apparatus comprising an annular ice-removing jacket having an annular slit to permit mounting the jacket over the annular body, and a pair of slide fastener units adapted to close the slit, each slide fastener unit extending along less than one half of the length of the slit and permitting separation of the margins of the slit entirely around the periphery of the jacket.

8. Apparatus for preventing the accumulation of ice upon an annular body, said apparatus comprising an annular ice-removing jacket having an annular slit to permit mounting the jacket over the annular body, slide fastener means for closing the slit, and a flap on one margin of the slit and extending over the closing means to shield the same.

9. Apparatus for preventing the accumulation of ice upon a body, said apparatus comprising an ice-removing jacket having a slit to permit mounting the jacket upon said body, slide fastener means for closing the slit, and a flap on one margin of the slit and extending over the closing means to shield the same.

10. Apparatus for preventing the accumulation of ice upon a body, said apparatus comprising an inflatable jacket having a slit to permit mounting the jacket upon the body, means for closing together the margins of the slit, and means for connecting the jacket to a source of inflating pressure through said body.

11. Apparatus for preventing the accumulation of ice upon an annular body having a supporting structure projecting therefrom, said apparatus comprising an annular double walled inflatable jacket having an annular slit to permit mounting the jacket upon the body, means on the margins of the jacket for closing together the margins of the slit, and means for connecting the jacket to a source of inflating pressure through said body and projecting structure.

12. Apparatus for preventing the accumulation of ice upon an annular body, said apparatus comprising an annular jacket having an annular slit to permit mounting the jacket upon the annular body, an inflatable tube within said body, a pair of slide fasteners adapted to close the slit, each slide fastener extending less than one half the length of the periphery of the jacket and permitting complete separation of the margins of the jacket and means for connecting the tube to a source of inflating pressure.

13. Apparatus for preventing the accumulation of ice upon an annular body, said apparatus comprising an annular inflatable jacket mounted upon the annular body, and means for inflating the jacket, the outer portion of said jacket comprising a zone stretchable predominantly in one direction, and another zone stretchable predominantly in a direction at an angle to the direction of stretch of the first said zone.

14. Apparatus for preventing the accumulation of ice upon an annular body, said apparatus comprising an annular jacket having an annular slit to permit mounting the jacket upon the annular body, an inflatable tube within the jacket, means for closing the slit, and means for connecting the jacket to a source of inflating pressure, said jacket having a zone thereof stretchable predominantly in a direction to increase the periphery thereof, and another zone stretchable predominantly in a direction to increase the cross-section of the jacket upon inflation thereof.

15. Apparatus for preventing the accumulation of ice upon an annular body, said apparatus comprising an annular ice-removing jacket having an annular slit to permit mounting the jacket over the annular body, means for closing the slit with margins thereof in juxtaposition, inflatable means in said jacket for changing the contour thereof, and a nipple connected to said inflatable means and extending inwardly of the jacket and adapted to be connected with a fluid passage in said body communicating with a source of fluid pressure.

16. Apparatus for preventing the accumulation of ice upon an annular body, said apparatus comprising an annular ice-removing jacket having a slit to permit mounting the jacket upon the annular body, means for closing the slit, inflatable means in said jacket for changing the contour thereof, and a threaded nipple rigidly connected to said inflatable means and adapted to be screwed into a threaded fluid passage in said body communicating with a source of fluid pressure.

17. A loop aerial comprising an annular tubular body mounted upon a rotatable stem for rotation about a diametrical axis thereof, said stem having a passage therethrough for conducting a fluid and terminating in an opening to receive said stem, a jacket adapted to enclose the tubular body, said jacket having means for changing the contour of said jacket, and a nipple communicating with said inflatable means and detachably connected to said opening.

18. A loop aerial comprising an annular tubular body mounted upon a rotatable stem for rotation about a diametrical axis thereof, said stem having a passage therethrough for conducting a fluid and terminating in a threaded opening on the periphery of said body adjacent the stem, a removable jacket adapted to enclose said body and having an opening to receive said stem, said jacket having inflatable means for changing the contour of said jacket, and a threaded nipple communicating with said inflatable means and detachably engaged in said threaded opening.

19. Apparatus of the class described for the leading edge of an airfoil, said apparatus comprising stretchable surface means disposed across the leading edge and at the sides of said leading edge, and means for extending said surface means outwardly from the leading edge, said surface means having a greater extent of stretchability at one side of the leading edge than the other whereby under extension it is caused to be moved predominately to the last mentioned side.

RUSSELL S. COLLEY.